Sept. 15, 1970 D. HIRSCH 3,529,143
SYSTEM FOR INITIALLY SETTING A PLURALITY
OF INTERACTING ANALOG MULTIPLIERS
Filed May 13, 1968
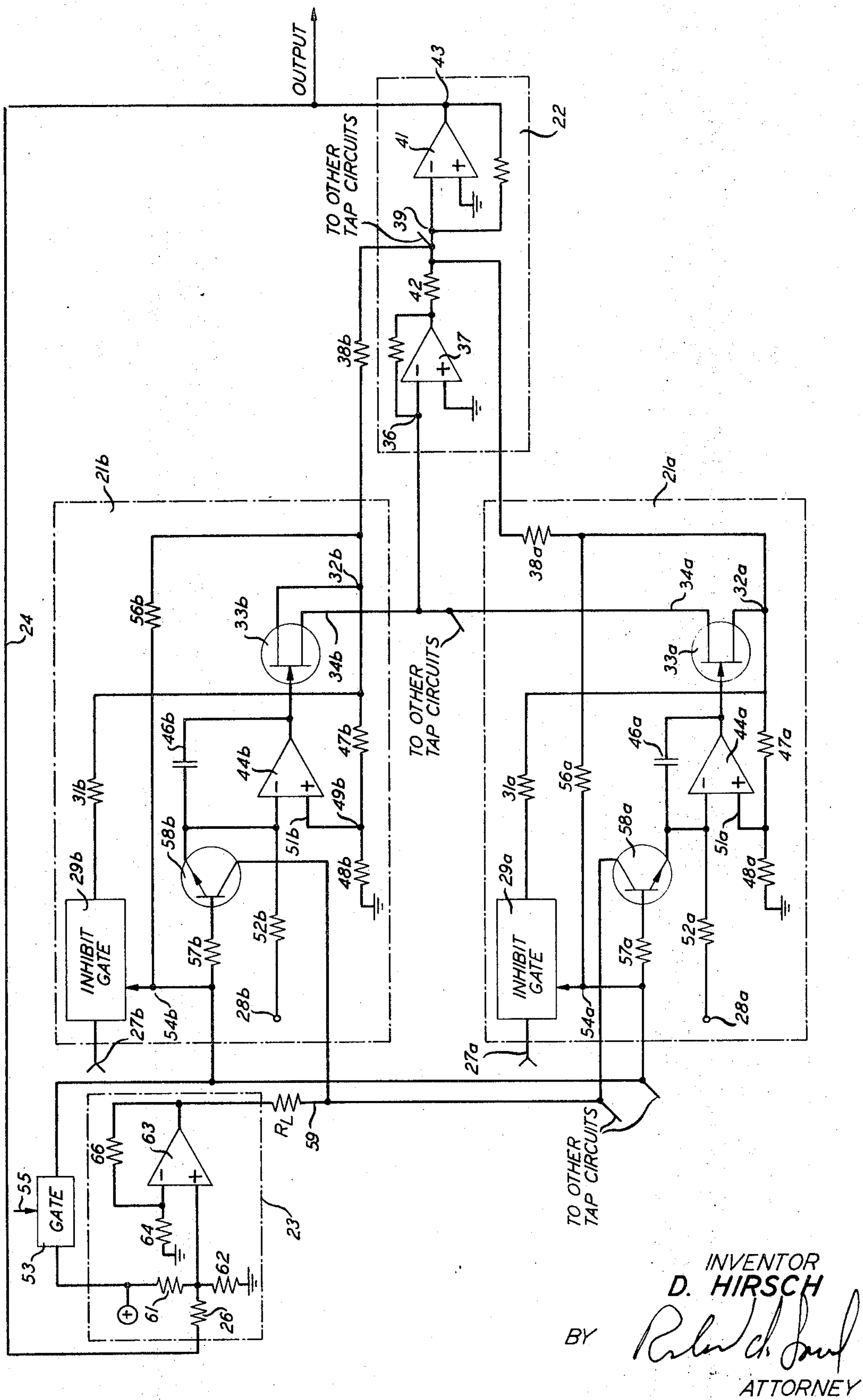
INVENTOR
D. HIRSCH
BY [signature]
ATTORNEY United States Patent Office 3,529,143
Patented Sept. 15, 1970

3,529,143

SYSTEM FOR INITIALLY SETTING A PLURALITY OF INTERACTING ANALOG MULTIPLIERS

Donald Hirsch, Matawan, N.J., assignor to Bell Telephone Laboratories, Incorporated, Murray Hill, N.J., a corporation of New York Filed May 13, 1968, Ser. No. 728,644
Int. Cl. G06g *7/16*; H04b *3/04*
U.S. Cl. 235—193 4 Claims

ABSTRACT OF THE DISCLOSURE

A feedback circuit is described in which output signals from a pair of equalizer tap circuits are added together to provide an equalized output signal. During an initial start-up interval the equalizer output signal is forced to zero by feedback circuits in each tap circuit. A second feedback loop senses the equalized output signal to correct the reference level supplied to the tap circuit feedback circuits if a non-zero output is present.

FIELD OF THE INVENTION

This invention relates to negative feedback systems and particularly to a negative feedback system in which two loosely coupled feedback loops cooperate to bring an output signal to a desired value.

BACKGROUND OF THE INVENTION

When a multifrequency signal which includes a series of individual data or symbol bits is transmitted through a bandwidth-limited medium, different frequency components in this signal may be delayed and attenuated different amounts so that components from more than one of the individual symbol bits may coincidentally arrive at a signal receiver thereby causing intersymbol interference. One device used to equalize a received signal distorted by intersymbol interference is a transversal filter equalizer.

The transversal filter equalizer is a time-domain device in which one or more equalization signals each equal to a multiple of the received signal, displaced in time, are added to the received signal to provide an equalized output signal. A plurality of multipliers is employed to provide the received signal multiples.

Automatic and adaptively adjusted transversal filter equalizers employ circuits to operate on the equalized output signal to derive adjusting signals for setting the values of the multiples for each of the plurality of multipliers. At the beginning of a transmission sequence, each multiplier has an arbitrary multiplication factor. To insure that the equalization signals which are initially added by these multipliers do not prolong or render impossible adaptive or automatic equalization, it has been found best to set each of the multipliers to a multiplication factor of zero.

Some automatic and adaptive transversal filter equalizers employ discrete value resistor attenuators in combination with inverting amplifiers as multipliers. The multiplying factors of these multipliers may be varied by using relays or transistors to physically switch resistors in the voltage dividers. At the start of automatic or adaptive adjusting of the transversal filter equalizer, the multiplying factors are set to zero by switching appropriate discrete value resistors in the attenuators. In this way, it is assured that arbitrary equalization signals are not added to the received signal. As equalization progresses, the multiplying factors are positively or negatively increased from zero in accordance with the adjusting signals to provide the proper equalization signals to equalize the received signal.

When tap multipliers are employed which utilize voltage-controlled impedance devices, a preset voltage signal is applied to the multiplier to set the multiplication factor initially to zero. When the voltage-controlled impedance is a Field Effect Transistor the preset voltage level is typically one quarter of a volt. The preset voltage signal is employed in some tap multipliers as a reference signal at a summing point of a feedback loop. In a multitap equalizer, each of the tap multipliers is normally constructed on individual plug-in boards. The preset voltage is generated by a circuit on a separate board. It has been found that even with properly designed preset tap multiplier circuits, reset voltage signal errors due to component variations and intra- and interboard lead impedance variations create nonzero multiplier output values.

The multiplier output values can be brought to zero by adjusting the reset voltage source. This, however, requires factory adjustment for each equalizer. A field adjustment would also be required each time a reference voltage circuit board were replaced.

BRIEF DESCRIPTION OF THE INVENTION

In the present invention a tap multiplier circuit, including an amplifier, is built on a first circuit board. A signal controllable reference voltage source is built on a second circuit board. An external wire connects the reference voltage source to the amplifier in the tap multiplier. An output condition sensor responsive to the output of the tap multiplier feeds a control signal back to adjust the reference voltage source.

In one embodiment, a second tap multiplier circuit, built on a second circuit board, is connected by a second external wire to the reference voltage source. The output condition sensor is responsive to the sum of the outputs from the two tap multipliers. In this embodiment, output signals from both the taps are brought to zero together.

DESCRIPTION OF THE DRAWING

The sole figure shows in schematic form a circuit embodying the further principles of this invention.

DETAILED DESCRIPTION

A feedback circuit is often employed to generate a voltage having a known D-C value. The heart of such a circuit is usually a high-gain differential amplifier. Typically, a voltage is applied from a reference voltage source to the noninverting terminal of the amplifier. A standard voltage is applied through a resistor to an inverting input terminal of the amplifier. A resistor is usually connected between an output and the inverting input of the amplifier.

In the circuit shown in the figure, output signals from two conventional feedback circuits are added together. Each of a pair of circuits 21*a* and 21*b*, enclosed in dashed lines in the figure, is an equalizer tap circuit. The circuitry enclosed in box 22 forms a summing amplifier.

Each of the tap circuits 21*a* or 21*b* when connected to a summing amplifier such as summing amplifier 22 forms a tap multiplier circuit similar to one disclosed in the copending application of E. Port, Ser. No. 663,148, filed Aug. 24, 1967, now U.S. Pat. 3,475,601. The summing amplifier 22, shown in the figure, is common to both the circuits 21*a* and 21*b*. Connected in this way, an output signal is provided which is identical to the signal which would be generated by adding the signals from two complete tap multiplier circuits.

During an initial start-up interval, voltage source 23 is enabled to provide both a voltage reference signal and a standard D-C voltage for feedback circuits in tap circuits 21*a* and 21*b* which set the output signal from the summing amplifier 22 to zero. In accordance with this invention, a lead 24 and a resistor 26 complete a second feedback loop by feeding the output signal from the summing amplifier 22 back to control the voltage reference signal supplied to the tap circuits 21*a* and 21*b*.

In normal operation, terminals 27*a* and 27*b* of the tap circuits 21*a* and 21*b*, respectively, are connected to taps of a delay line of a transversal filter equalizer. A received data signal from a source, not shown, propagating down the delay line impresses time delayed replicas of the received signal upon each of the terminals 27*a* and 27*b*. The delayed replicas of the received data signal on the terminals 27*a* and 27*b* are multiplied by values determined upon integration of differential adjusting signals applied to adjusting input terminals 28*a* and 28*b*, respectively. The differential adjusting signals are derived by equipment, not shown, in response to the output signal from summing amplifier 22.

The received replicas on the terminals 27*a* and 27*b* are normally passed by inhibit gates 29*a* and 29*b* through resistors 31*a* and 31*b* to drain electrodes 32*a* and 32*b* of field effect transistors 33*a* and 33*b*, respectively. Source electrodes 34*a* and 34*b* of the field effect transistors 33*a* and 33*b* are connected at an input terminal 36 of an inverting operational amplifier 37 to maintain the source electrodes 34*a* and 34*b* of the field effect transistors 33*a* and 33*b* at a virtual ground potential. The voltage appearing at the output of amplifier 37 is proportional to the sum of the voltages across the source and drain of field effect transistors 33*a* and 33*b* divided by the respective source-to-drain impedances. Since the voltage between the source and drain of field effect transistors 33*a* and 33*b* are directly related to the signal on terminals 27*a* and 27*b*, respectively, the output signal from amplifier 37 is proportional to the sum of the products of the signals applied to terminals 27*a* and 27*b* and the source-to-drain conductance of field effect transistors 33*a* and 33*b*, respectively.

Since the amplifier 37 inverts signals applied to input terminal 36, one is able to multiply the signals appearing on terminals 27*a* and 27*b* by either positive, zero, or negative values, by adding a signal directly proportional to the signal appearing on terminals 27*a* and 27*b* to the output signal from amplifier 37. The signal at the output of amplifier 37 can then be adjusted so that the sum of the signals can be positive, negative, or zero. To this end, resistors 38*a* and 38*b* are connected from the drains 32*a* and 32*b* of field effect transistors 33*a* and 33*b*, respectively, to inverting input terminal 39 of amplifier 41. Resistor 42 is provided to apply the signal from amplifier 37 to input 39 of amplifier 41 so that the signal appearing on output terminal 43 thereof is proportional to the sum of the products of the signal appearing on the terminals 27*a* and 27*b* and the source-to-drain conductance of field effect transistors 33*a* and 33*b*, respectively. As has been pointed out, the output signal on terminal 43 can be set to zero or to positive or negative multiples of the input signal on terminals 27*a* and 27*b* by appropriate adjustment of the source-to-drain impedance of field effect transistors 33*a* and 33*b*.

The source-to-drain impedance of the field effect transistors 33*a* and 33*b* are adjusted by varying the gate-to-source voltage thereof. Inverting operational amplifiers 44*a* and 44*b* shunted by capacitors 46*a* and 46*b* are employed as Miller integrators to control the gate-to-source voltages of field effect transistors 33*a* and 33*b*, respectively. A Miller integrator is a high-negative gain amplifier with capacitive feedback. High-impedance voltage dividers, comprising resistors 47*a* and 47*b* and 48*a* and 48*b*, each having typical values of 150K ohms and joined at center positions 49*a* and 49*b*, respectively, are connected between drains 32*a* and 32*b* of the field effect transistors 33*a* and 33*b* and ground. The center positions 49*a* and 49*b* of the voltage dividers are connected to non-inverting input terminals 51*a* and 51*b* of the amplifiers 44*a* and 44*b*, respectively. Voltage variations at drains 32*a* and 32*b* of field effect transistors 33*a* and 33*b* are therefore fed back to amplifiers 44*a* and 44*b*, respectively, and therefore to the gates of field effect transistors 32*a* and 32*b* linearizing the source-to-drain current versus source-to-drain voltage characteristics of the field effect transistors. The inverting inputs of amplifiers 44*a* and 44*b* therefore are always at a voltage equal to one-half the voltage across the respective field effect transistors 33*a* and 33*b*. This maintains the gate-to-source A-C voltage of field effect transistors 33*a* and 33*b* at one-half the respective drain-to-source A-C voltages. For a more complete discussion of this linearizing technique, see "Circuit Applications of the Field Effect Transistor," published in the March 1962 issue of "Semiconductor Products," pp. 31 and 32.

It should be noted that sources 34*a* and 34*b* of field effect transistors 33*a* and 33*b* are maintained at a virtual ground by amplifier 37 so that the voltage dividers may be returned directly to ground to linearize field effect transistors 33*a* and 33*b*. Alternately, the current flowing through field effect transistors 33*a* and 33*b* and resistors 38*a* and 38*b* may be directly subtracted in a differential amplifier having common mode rejection. However, the common mode signal, which would also vary the voltage across field effect transistors 33*a* and 33*b* would not be compensated for by the ground returned voltage-divider feedback. The result is that the common mode signal would have to be made small with respect to the voltage across field effect transistors 33*a* and 33*b*.

The differential adjusting signals on terminals 28*a* and 28*b* are applied to amplifiers 44*a* and 44*b* through resistors 52*a* and 52*b*, respectively. In normal operation, the replica signals applied to input terminals 27*a* and 27*b* are multiplied by a factor proportional to the source-to-drain conductances of the field effect transistors 33*a* and 33*b* which are controlled by the integral of the differential adjusting signal applied to the teminals 28*a* and 28*b*.

The initial value of source-to-drain impedances of field effect transistors 33*a* and 33*b* and therefore the initial value by which the replica signals on terminals 27*a* and 27*b* are multiplied, is set when an initialization pulse is applied to an input terminal 55 of gate 53 from a source, not shown. The initialization pulse, extracted from the received data signal by circuits, not shown, indicates the beginning of a transmission requiring adjustment of the equalizer circuits.

The gate 53 applies a voltage +V to inhibit inputs 54*a* and 54*b* of inhibit gates 29*a* and 29*b*, respectively, to block the delayed replica so that no voltage appears across the resistors 31*a* and 31*b*, respectively. Resistors 56*a* and 56*b* are connected between the inhibit terminals 54*a* and 54*b*, respectively, and the drains 32*a* and 32*b* of the field effect transistors 33*a* and 33*b*. Resistors 56*a* and 56*b* functionally replace resistors 31*a* and 31*b* during the preset sequence. The voltage applied to the inhibit terminals 54*a* and 54*b* is of a standard amplitude so that with resistors 56*a* and 56*b* in series with the source-to-drain impedances of the field effect transistors, the voltages appearing at the drains 32*a* and 32*b* of the field effect transistors are determined by the source-to-drain impedances of the field effect transistors. It should be noted that the source-to-drain impedances of the field effect transistors 33*a* and 33*b* are effectively in parallel with the fixed value resistors 38*a* and 38*b*.

The voltage from gate 53 is also applied through resistors 57*a* and 57*b* to saturate normally off transistors 58*a* and 58*b*. Saturation of transistors 58*a* and 58*b* applies voltage from the voltage source 23 to the inverting inputs of operational amplifiers 44*a* and 44*b*, respectively. The low impedance applied to the inverting input of operational amplifiers 44*a* and 44*b* through saturated transistors 58*a* and 58*b*, respectively, from voltage source 23 overrides signals which might be applied at the terminals 28*a* and 28*b*, respectively, through resistors 52*a* and 52*b* by bringing the summing point of the Miller integrators, which include amplifiers 44*a* and 44*b*, capacitors 46*a* and 46*b* and resistor 52*a* and 52*b* to a low impedance condition. The noninverting inputs of operational amplifiers 44*a* and 44*b* become the summing points for a negative feedback loop which includes amplifiers 44*a* and 44*b* and field effect transistors 33*a* and 33*b*, respectively. It should be noted that the inversion necessary for negative feedback is supplied by field effect transistors 33*a* and 33*b*. Resistors 47*a* and 47*b* and 48*a* and 48*b* in the voltage dividers drive the amplifiers 44*a* and 44*b*, respectively, to vary the gate voltage of field effect transistors 33*a* and 33*b* until the voltage at the drains thereof are essentially twice the voltages supplied by voltage source 23. By forcing the drains to this voltage while the reference voltage from gate 53 is fed to resistors 56*a* and 56*b*, the feedback loop forces the field effect transistors to assume specific resistance values. The low impedance output of the amplifiers 44*a* and 44*b* charge capacitors 46*a* and 46*b* to store the voltage applied to the gates of field effect transistors 33*a* and 33*b*.

When the preset signal is removed returning the circuit to normal operation, the gate voltages of field effect transistors 33*a* and 33*b* are one-half source-to-drain voltages increased by the voltage across the capacitors 46*a* and 46*b*. As differential adjusting signals are received on terminals 28*a* and 28*b* and integrated by capacitors 46*a* and 46*b*, the source-to-drain impedances of the field effect transistors 33*a* and 33*b* are varied accordingly.

When the voltage source 23 is on a separate circuit board from the tap circuits 21*a* and 21*b*, current flowing in a lead 59 causing a voltage drop across the lead impedance is shown as a lumped value $R_L$. It should be noted that current must flow in this lead so that base current can flow to saturate transistors 58*a* and 58*b*. The amount of current flowing in the lead is determined by the value of the resistors 57*a* and 57*b*. As the number of tap circuits is varied, the current flowing through lead 59 will also vary. Because of the limited operating range of present field effect transistors, the voltage supplied by voltage source 23 is typically 250 millivolts. Therefore, a few millivolts drop in the lead 59 will cause unacceptable errors. To compensate for this, and for component tolerances in voltage source 23, the voltage source 23 includes resistor 26 having a first end connected to a center tap of a voltage divider including voltage resistors 61 and 62. The voltage divider is connected between +V and gound. The center tap is also connected to the noninverting terminal of an amplifier 63. These three resistors 26, 61, and 62, together with resistors 64 and 66 determine the output voltage of voltage source 23. With the opposite end of resistors 26 grounded, the proper voltage is supplied by the voltage source 23.

The lead 24 connects the output terminal 43 of the summing amplifier circuit 22 to the opposite end of resistor 26. Therefore, if the voltage appearing at terminal 43 is zero volt, no signal is fed back. If, however, the voltage drop across $R_L$, or inexact component values in 23, drives the voltage at terminal 43 to a nonzero value, a signal is fed back to alter the reference voltage supplied by voltage source 23 to the feedback circuits in tap circuits 21*a* and 21*b*.

It should be understood that the above-described arrangements are illustrative of the application of the principles of the invention. Numerous other arrangements may be devised by those skilled in the art without departing from the spirit and scope of the invention.

What is claimed is:

1. A system in which signals from a plurality of analog multipliers are added together to provide a sum siganl; each of said analog multipliers being initially set to a predetermined value upon application of a reference signal from a reference signal source; said system characterized by:
   means responsive to said sum signal for adjusting said reference signal source.

2. The system as described in claim 1 in which:
   each of said multipliers includes a field effect transistor having gate, source and drain terminals for providing a variable impedance between said source terminal and said drain terminal;
   said reference signal source also supplies a standard voltage;
   said system also includes:
      means for applying said standard voltage to said drain terminal of each of said field effect transistors; and
      amplifier means for applying said reference signal to said gate terminal of each of said field effect transistors.

3. The system defined in claim 2 in which:
   said amplifier means includes a capacitor for storing said adjusted reference signal.

4. The system as defined in claim 3 in which:
   said means for applying said standard voltage includes a plurality of resistors, each of said plurality of resistors forming a voltage divider with one of said field effect transistors.

References Cited

UNITED STATES PATENTS

| | | | |
|---|---|---|---|
| 3,271,703 | 9/1966 | Kaenel. | |
| 3,283,063 | 11/1966 | Kawashima et al. | 333—28 X |
| 3,292,110 | 12/1966 | Becker et al. | 333—18 |
| 3,297,951 | 1/1967 | Blasbalg | 333—28 X |
| 3,305,798 | 2/1967 | Rappeport | 333—18 |
| 3,308,431 | 3/1967 | Hopner et al. | 325—42 X |
| 3,392,352 | 2/1968 | White | 307—304 X |

EUGENE G. BOTZ, Primary Examiner

J. F. RUGGIERO, Assistant Examiner

U.S. Cl. X.R.

235—194; 333—18